(12) United States Patent
Oh et al.

(10) Patent No.: US 10,747,045 B2
(45) Date of Patent: Aug. 18, 2020

(54) OPTICAL FILM FOR IMPROVING CONTRAST RATIO, POLARIZING PLATE INCLUDING THE SAME, AND LIQUID CRYSTAL DISPLAY APPARATUS INCLUDING THE SAME

(71) Applicant: SAMSUNG SDI CO., LTD., Yongin-si, Gyeonggi-do (KR)

(72) Inventors: Young Oh, Suwon-si (KR); Jeong Ho Lee, Suwon-si (KR); Yong Un Jung, Suwon-si (KR); Jang Hyun Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 175 days.

(21) Appl. No.: 15/895,931

(22) Filed: Feb. 13, 2018

(65) Prior Publication Data
US 2018/0231826 A1 Aug. 16, 2018

(30) Foreign Application Priority Data
Feb. 14, 2017 (KR) .......................... 10-2017-0020226

(51) Int. Cl.
*G02F 1/1335* (2006.01)
*G02F 1/1333* (2006.01)
(Continued)

(52) U.S. Cl.
CPC .. *G02F 1/133502* (2013.01); *G02F 1/133504* (2013.01); *G02B 5/003* (2013.01);
(Continued)

(58) Field of Classification Search
None
See application file for complete search history.

(56) References Cited

U.S. PATENT DOCUMENTS

2006/0103779 A1* 5/2006 Amemiya ......... G02F 1/133524
349/95
2011/0242463 A1* 10/2011 Park .................... G02B 5/0263
349/106
(Continued)

FOREIGN PATENT DOCUMENTS

| CN | 1493891 A | 5/2004 |
|---|---|---|
| CN | 101128755 A | 2/2008 |

(Continued)

OTHER PUBLICATIONS

Taiwan Office action in corresponding Taiwan Patent Application No. 107105244, Taiwan Office action dated Sep. 28, 2018 (8 pgs.).
(Continued)

*Primary Examiner* — Derek S. Chapel
(74) *Attorney, Agent, or Firm* — Lewis Roca Rothgerber Christie LLP

(57) ABSTRACT

An optical film for improving contrast ratio, a polarizing plate including the same, and a liquid crystal display including the polarizing plate are provided. An optical film for improving contrast ratio includes a protective layer and a contrast ratio improving layer on the protective layer, and the contrast ratio improving layer includes a first resin layer and a second resin layer facing the first resin layer, and the second resin layer includes a patterned portion having optical patterns and a flat section between the optical patterns, contains a light absorber, and satisfies Equation 1 as defined herein.

19 Claims, 2 Drawing Sheets

(51) Int. Cl.
*G02B 5/00* (2006.01)
*G02B 5/30* (2006.01)

(52) U.S. Cl.
CPC ...... *G02B 5/3033* (2013.01); *G02F 1/133528* (2013.01); *G02F 2001/133311* (2013.01)

(56) References Cited

U.S. PATENT DOCUMENTS

| | | | | |
|---|---|---|---|---|
| 2015/0103338 A1* | 4/2015 | Kim | .................... | H01L 51/5275 |
| | | | | 356/237.1 |
| 2016/0187682 A1* | 6/2016 | Oh | ........................ | G02B 5/045 |
| | | | | 349/96 |
| 2016/0187699 A1* | 6/2016 | Ju | .................... | G02F 1/133528 |
| | | | | 349/65 |
| 2019/0129079 A1* | 5/2019 | Lee | ....................... | G02B 5/305 |
| 2019/0187349 A1* | 6/2019 | Lee | ........................... | B32B 7/12 |
| 2019/0243042 A1* | 8/2019 | Wee | .......................... | G02B 1/11 |
| 2020/0057333 A1* | 2/2020 | Ju | ........................... | B32B 27/08 |
| 2020/0073172 A1* | 3/2020 | Wee | ........................ | G02B 1/04 |

FOREIGN PATENT DOCUMENTS

| | | |
|---|---|---|
| JP | 2006-145611 A | 6/2006 |
| JP | 2013-109083 A | 6/2013 |
| JP | 2014-115359 A | 6/2014 |
| TW | 200639571 A | 11/2006 |
| TW | 201643483 A | 12/2016 |

OTHER PUBLICATIONS

China Office Action issued in corresponding China Application No. 201810153314.3, China Office Action dated Feb. 3, 2020 (8 pgs.).

* cited by examiner

OPTICAL FILM FOR IMPROVING CONTRAST RATIO, POLARIZING PLATE INCLUDING THE SAME, AND LIQUID CRYSTAL DISPLAY APPARATUS INCLUDING THE SAME

CROSS-REFERENCE TO RELATED APPLICATION

This application claims priority to and the benefit of Korean Patent Application 10-2017-0020226, filed on Feb. 14, 2017 in the Korean Intellectual Property Office, the entire disclosure of which is incorporated herein by reference.

BACKGROUND

1. Field

Aspects of embodiments of the present invention relate to an optical film for improving contrast ratio, a polarizing plate including the same, and a liquid crystal display including the same. Further, aspects of embodiments of the present invention relate to an optical film for improving contrast ratio, which can improve front brightness, front contrast ratio, and side contrast ratio while increasing viewing angle, and which can improve image quality and black visibility even in a non-driven state by reducing minimum reflectance, a polarizing plate including the same, and a liquid crystal display including the same.

2. Description of the Related Art

A liquid crystal display is operated to emit light through a liquid crystal panel after receiving the light from a backlight unit. Since light from the backlight unit is perpendicularly incident upon a screen of a liquid crystal display, the screen of the liquid crystal display inevitably has a lower contrast ratio (CR) when viewed in a lateral direction than when viewed in a front direction. Therefore, optical films for improving side contrast ratio are being developed.

Generally, an optical film for improving contrast ratio improves a contrast ratio using optical patterns. For example, the contrast ratio can be improved by an optical film in which flat sections and optical patterns are alternately formed. The optical pattern includes an inclined surface and can improve the contrast ratio by refracting and diffusing light incident upon the inclined surface, and the flat section can diffuse light and maintain brightness by emitting light reaching the flat section. However, although side contrast ratio can be improved through such an optical pattern, front contrast ratio is generally reduced. Therefore, there is a need for a polarizing plate capable of improving side contrast ratio while minimizing or reducing reduction in front contrast ratio.

SUMMARY

According to an aspect of embodiments of the present invention, an optical film for improving contrast ratio is capable of improving front brightness, front contrast ratio, and side contrast ratio.

According to another aspect of embodiments of the present invention, an optical film for improving contrast ratio is capable of increasing side viewing angle.

According to another aspect of embodiments of the present invention, an optical film for improving contrast ratio is capable of improving image quality and black visibility even in a non-driven state by reducing minimum reflectance.

According to another aspect of embodiments of the present invention, a polarizing plate includes the optical film for improving contrast ratio according to the present invention.

According to another aspect of embodiments of the present invention, a polarizing plate does not require an anti-reflective film and, thus, has a reduced thickness.

In accordance with an aspect of one or more embodiments of the present invention, an optical film for improving contrast ratio includes a protective layer and a contrast ratio improving layer on the protective layer, wherein the contrast ratio improving layer includes a first resin layer and a second resin layer facing the first resin layer, and the second resin layer includes a patterned portion having optical patterns and a flat section between the optical patterns, contains a light absorber, and satisfies the following Equation 1:

$$(H2-H1) < R \leq H1$$

where H2 is a maximum thickness (unit: μm) of the second resin layer, H1 is a maximum height (unit: μm) of the optical patterns, and R is an average diameter (D50) (unit: μm) of the light absorber.

In accordance with another aspect of one or more embodiments of the present invention, a polarizing plate includes a polarizing film and the optical film for improving contrast ratio according to the present invention, the optical film for improving contrast ratio being arranged on a surface of the polarizing film.

In accordance with another aspect of one or more embodiments of the present invention, a liquid crystal display includes the polarizing plate according to the present invention.

According to an aspect of embodiments of the present invention, an optical film for improving contrast ratio capable of improving front brightness, front contrast ratio, and side contrast ratio is provided.

According to another aspect of embodiments of the present invention, an optical film for improving contrast ratio capable of increasing side viewing angle is provided.

According to another aspect of embodiments of the present invention, an optical film for improving contrast ratio capable of improving image quality and black visibility even in a non-driven state by reducing minimum reflectance is provided.

According to another aspect of embodiments of the present invention, a polarizing plate including the optical film for improving contrast ratio according to the present invention is provided.

According to another aspect of embodiments of the present invention, a polarizing plate that does not require an anti-reflective film and has a reduced thickness is provided.

DETAILED DESCRIPTION

Figure 1:
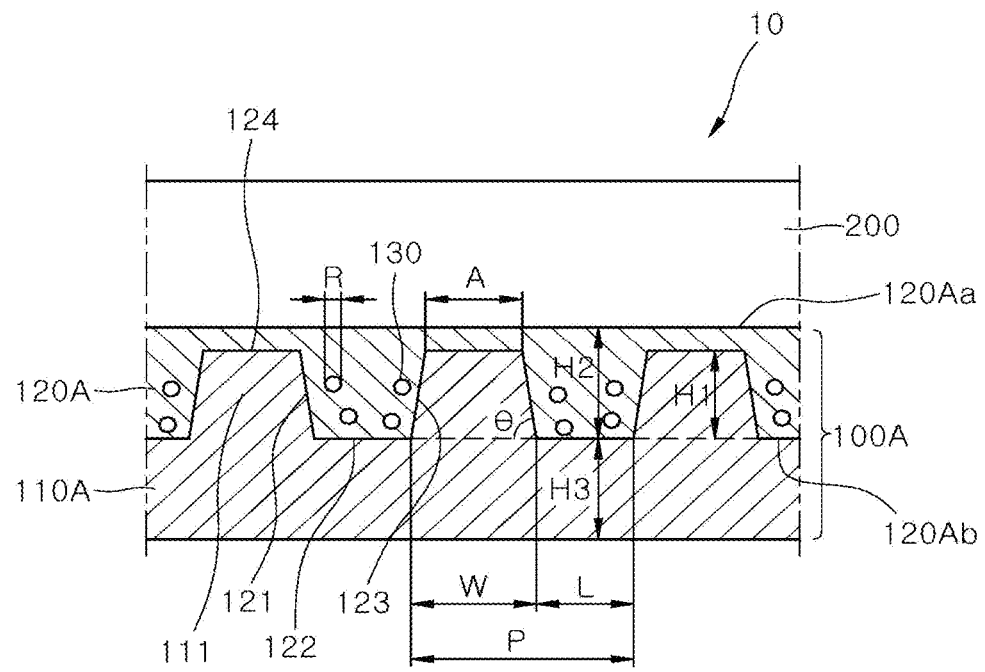
FIG. 1 is a cross-sectional view of an optical film for improving contrast ratio according to an embodiment of the present invention.

Some embodiments of the present invention will be described in further detail with reference to the accompanying drawings to provide a thorough understanding of the present invention to those skilled in the art. It is to be understood that the present invention may be embodied in different ways and is not limited to the following embodiments. In the drawings, portions irrelevant to the description may be omitted for clarity. Like components are denoted by like reference numerals throughout the specification.

Herein, spatially relative terms such as "upper" and "lower" are defined with reference to the accompanying drawings. Thus, it is to be understood that the term "upper surface" can be used interchangeably with the term "lower surface," and when an element, such as a layer or a film, is referred to as being placed "on" another element, it can be placed directly on the other element, or one or more intervening elements may be present. On the other hand, when an element is referred to as being placed "directly on" another element, there are no intervening elements therebetween.

Herein, the terms "horizontal direction" and "vertical direction" mean a longitudinal direction and a transverse direction of a rectangular screen of a liquid crystal display, respectively. Herein, "side" refers to a region in which θ ranges from 0° to 60° in the spherical coordinate system represented by (ϕ, θ) in which a front side is indicated by (0°, 0°), a left end point is indicated by (180°, 90°), and a right end point is indicated by (0°, 90°) with reference to the horizontal direction.

Herein, the term "top part" refers to the highest portion in an engraved optical pattern.

Herein, "aspect ratio" refers to a ratio of maximum height of an optical pattern to maximum width thereof (maximum height/maximum width).

Herein, "pitch" refers to a distance between adjacent optical patterns, that is, the sum of the maximum width of one optical pattern and the width of one flat section.

Herein, "in-plane retardation (Re)" is a value measured at a wavelength of 550 nm and is represented by Equation A:

$$Re=(nx-ny)\times d$$

where nx and ny are the indices of refraction in the slow and fast axes of a corresponding protective layer or base layer at a wavelength of 550 nm, respectively, and d is the thickness (unit: nm) of the protective layer or base layer.

As used herein, the term "(meth)acryl" refers to acryl and/or methacryl.

Herein, an optical film for improving contrast ratio according to an embodiment of the present invention will be described with reference to FIG. 1. FIG. 1 is a cross-sectional view of an optical film for improving contrast ratio according to an embodiment of the present invention.

Referring to FIG. 1, an optical film for improving contrast ratio 10 may include a contrast ratio improving layer 100A and a protective layer 200. Although not shown in FIG. 1, the optical film for improving contrast ratio 10 may be formed on a light exit surface of a polarizing film.

Contrast Ratio Improving Layer

The contrast ratio improving layer 100A includes a first resin layer 110A and a second resin layer 120A facing the first resin layer 110A.

Second Resin Layer

The second resin layer 120A is formed on a light exit surface of the first resin layer 110A. The second resin layer 120A can increase light diffusion by diffusing light incident from the light exit surface of the first resin layer 110A.

The second resin layer 120A includes a patterned portion having one or more optical patterns 121 and a flat section 122 between an optical pattern 121 and an adjacent optical pattern 121. An optical pattern 121 includes at least one inclined surface 123 inclined with respect to the flat section 122. The second resin layer 120A includes a light absorber 130 having a light absorbing layer (not shown in FIG. 1). The second resin layer 120A includes an upper surface 120Aa and a lower surface 120Ab. The upper surface 120Aa of the second resin layer 120A contacts a protective layer 200. The lower surface 120Ab of the second resin layer 120A corresponds to the patterned portion.

The second resin layer 120A satisfies Equation 1:

$$(H2-H1)<R\leq H1$$

where H2 is the maximum thickness (unit: μm) of the second resin layer, H1 is the maximum height (unit: μm) of the optical pattern, and R is an average diameter (D50) (unit: μm) of the light absorber.

According to Equation 1, the average diameter R of the light absorber 130 is less than or equal to the maximum height H1 of the optical pattern 121. Therefore, the light absorber 130 may be present in a region of the second resin layer 120A between adjacent optical patterns 121. Since the light absorber 130 is present between the adjacent optical patterns 121 and thus absorbs light which reaches the flat section 122 while being incident from the first resin layer 110A in a lateral direction, reduction in front contrast ratio can be minimized or reduced by preventing total reflection of the light by an inclined surface 123 of the optical pattern 121, as compared with a contrast ratio improving layer not including the light absorber, thereby improving front contrast ratio and front relative brightness while increasing side contrast ratio. In this way, minimum reflectance of the optical film for improving contrast ratio is reduced, thereby improving black visibility and image quality of a screen of an optical display when the optical display is not driven. Therefore, the optical film for improving contrast ratio 10 reduces a need for use of additional anti-reflective films when applied to an optical display, thereby allowing thickness reduction of the optical display. In an embodiment, the optical film for improving contrast ratio 10 may have a minimum reflectance of about 3.90% or less, and, in an embodiment, about 3.88% or less, and, in an embodiment, about 3.80% or less, as measured from a protective layer 200 side. Within this range, black visibility and image quality of a screen of an optical display can be improved when the optical display is not driven. In an exemplary embodiment, the second resin layer 120A satisfies R<H1.

According to Equation 1, H2−H1, which corresponds to the expression (Maximum thickness of second resin layer−Maximum height of optical pattern), is less than the average diameter R of the light absorber. Therefore, the light absorber 130 is not present in a region of the second resin layer 120A between a first surface 124, which corresponds to the top part of the optical pattern, and the upper surface 120Aa of the second resin layer 120A. If the light absorber is present in the region of the second resin layer 120A set forth above, since absorption of light reaching the flat section 122 from the first resin layer 110A cannot be expected due to a large distance between the flat section and the light absorber, there is an insignificant or almost no effect of improving front contrast ratio, and the optical film for improving contrast ratio can become opaque due to the light absorber.

In an exemplary embodiment, the light absorber 130 is present in a region between adjacent optical patterns 121, that is, in a region lower than the top part of the optical pattern 121, in other words, in a trapezoidal region formed by the flat section 122 and the inclined surfaces 123 of the adjacent optical patterns in FIG. 1. In an embodiment, the light absorber 130 may be present in a region of the second resin layer 120A except a region thereof between the first surface 124, which corresponds to the top part of the optical pattern 121, and the upper surface 120Aa of the second resin layer 120A.

In an embodiment, the patterned portion may satisfy Equation 2 below, and the optical pattern 121 may have a base angle θ of about 75° to about 90°. The base angle θ refers to an angle formed between the inclined surface 123 of the optical pattern 121 and a line along a maximum width W of the optical pattern 121. Within this range, the optical film for improving contrast ratio can improve relative brightness in the front direction, improve both the front contrast ratio and the side contrast ratio, reduce a difference between the front contrast ratio and the side contrast ratio, and improve the contrast ratio at the same side viewing angle and the same front viewing angle. In an embodiment, the optical pattern 121 may have a base angle θ of about 80° to about 90° and the patterned portion may have a value of P/W of about 1.2 to about 8.

$$1 < P/W \leq 10 \qquad \text{Equation 2}$$

where P is a period (unit: μm) of the patterned portion, and W is the maximum width (unit: μm) of the optical pattern).

Although FIG. 1 shows a structure in which both base angles of the optical pattern are equal to each other, the optical pattern, in an embodiment, may have different base angles so long as the base angles range from 75° to about 90° as described above.

The optical pattern 121 may be an optical pattern including the first surface 124 formed at the top part thereof and at least one inclined surface 123 connected to the first surface 124. Although FIG. 1 shows a trapezoidal optical pattern in which two adjacent inclined surfaces 123 are connected to each other via the first surface 124, the present invention is not limited thereto.

The first surface 124 is formed at the top part of the optical pattern and can improve viewing angle and brightness by further diffusing light reaching the second resin layer 120A in an optical display. Therefore, the optical film for improving contrast ratio can improve light diffusion, thereby minimizing or reducing brightness loss.

The first surface 124 may be a flat surface to facilitate a process of forming the optical film for improving contrast ratio. Alternatively, the first surface 124 may have fine roughness or a curved surface. In the structure in which the first surface 124 is a curved surface, the optical pattern may be realized by a lenticular lens pattern. FIG. 1 shows an engraved pattern which includes one flat surface formed at the top part thereof and flat inclined surfaces and has a trapezoidal cross-section (for example, a truncated prism pattern having a truncated triangular cross-section, that is, a truncated prism shape or a cut-prism shape). Alternatively, the optical pattern may be an engraved pattern in which the first surface is formed at the top part thereof and the inclined surfaces are curved surfaces (for example, a contrast ratio improving layer having a truncated lenticular (cut-lenticular) lens pattern or a truncated microlens (cut-microlens) pattern). In an exemplary embodiment, the optical pattern has a square or rectangular cross-section. Alternatively, the engraved optical pattern may have a cross-section of an N-sided polygonal shape (where N is an integer of 3 to 20), such as a rectangle, a square, or the like.

The first surface 124 may be parallel to at least one of the flat section 122, a lowermost surface of the first resin layer 110A, and an uppermost surface of the second resin layer 120A (that is, the upper surface of the second resin layer). FIG. 1 shows a structure in which the first surface 124 of the optical pattern 121, the flat section 122, the lowermost surface of the first resin layer 110A, and the uppermost surface of the second resin layer 120A are parallel to each other.

In an embodiment, the first surface 124 may have a width A of about 0.5 μm to about 30 μm, and, in an embodiment, about 2 μm to about 20 μm. Within this range, the first surface 124 can be applied to an optical display and can be expected to improve contrast ratio.

The optical pattern 121 may have an aspect ratio (H1/W) of about 0.1 to about 10.0, and, in an embodiment, about 0.1 to about 7.0, and, in an embodiment, about 0.1 to about 5.0 or about 0.1 to about 2.0. Within this range, an optical display can exhibit improved contrast ratio and viewing angle in a lateral direction.

In an embodiment, the optical pattern 121 may have a maximum height H1 of about 20 μm or less, and, in an embodiment, about 15 μm or less, and, in an embodiment, about 10 μm or less. Within this range, an optical display can exhibit improvement in contrast ratio, viewing angle and brightness without suffering from the Moiré phenomenon and the like.

In an embodiment, the optical pattern 121 may have a maximum width W of about 20 μm or less, and, in an embodiment, about 15 μm or less, and, in an embodiment, about 10 μm or less. Within this range, an optical display can exhibit improvement in contrast ratio, viewing angle and brightness without suffering from the Moiré phenomenon and the like.

FIG. 1 shows a structure in which adjacent optical patterns of the patterned portion have the same base angle, the same width of the first surface, the same maximum height, and the same maximum width. However, the adjacent optical patterns may have different maximum widths, different widths of the first surfaces, different maximum heights, and different maximum widths.

Upon receiving light from the first resin layer 110A, the flat section 122 may emit the light to the second resin layer 120A, thereby improving front brightness.

In an embodiment, a ratio (W/L) of the maximum width W of the optical pattern 121 to a width L of the flat section 122 may be about 9 or less, and, in an embodiment, may be in a range from about 0.1 to about 3, and, in an embodiment, from about 0.15 to about 2. Within this range, the optical film for improving contrast ratio can improve relative brightness in the front direction, reduce a difference between the front contrast ratio and the side contrast ratio, and improve the contrast ratio at the same side viewing angle and the same front viewing angle. In addition, the optical film for improving contrast ratio can prevent or substantially prevent the Moiré phenomenon. In an embodiment, the flat section 122 may have a width L of about 1 μm to about 300 μm, and, in an embodiment, about 1 μm to about 50 μm. Within this range, the optical film for improving contrast ratio can improve front brightness.

The maximum width W of one optical pattern 121 and the flat section 122 directly adjacent thereto form one pitch P.

In an embodiment, the pitch P may be in a range from about 1 μm to about 500 μm, and, in an embodiment, from about 1 μm to about 50 μm. Within this range, the optical pattern can improve brightness and contrast ratio without causing the Moiré phenomenon.

Although FIG. 1 shows a structure in which adjacent pitches of the patterned portion are the same, it should be understood that the pitches may be different from one another or at least one of adjacent pitches may be different from the other pitches.

In an embodiment, the second resin layer 120A may have a maximum thickness H2 of about 50 μm or less, and, in an embodiment, about 30 μm or less. Within this range, the optical film for improving contrast ratio can minimize or reduce decrement in side CR.

In an embodiment, a value of the expression (Maximum thickness of second resin layer 120A–Maximum height of optical pattern 121), that is, (H2–H1) (also referred to as "wall thickness") may be about 30 μm or less, and, in an embodiment, about 20 μm or less, or about 10 μm or less. Within this range, the optical film for improving contrast ratio 10 can minimize or reduce reduction in side contrast ratio.

FIG. 1 illustrates a structure in which the optical pattern is an engraved pattern. However, the optical pattern may be an embossed pattern.

Although not clearly shown in FIG. 1, FIG. 1 shows a structure in which the optical patterns extend in a stripe shape. Alternatively, the optical patterns may be formed in a dot shape. The term "dot" means that combinations of a filling pattern and an optical pattern are dispersed.

The second resin layer 120A has a higher index of refraction than the first resin layer 110A. Therefore, when light enters a light incident surface of the first resin layer 110A, the contrast ratio improving layer 100A diffuses and emits the light, thereby improving relative brightness in the front direction, improving both the front contrast ratio and the side contrast ratio, minimizing or reducing reduction in the front contrast ratio despite increasing the side contrast ratio, reducing a difference between the front contrast ratio and the side contrast ratio, and improving the contrast ratio at the same side viewing angle and the same front viewing angle.

In an embodiment, an absolute value of a difference in index of refraction between the second resin layer 120A and the first resin layer 110A (index of refraction of second resin layer 120A-index of refraction of first resin layer 110A) may be in a range from about 0.05 to about 0.30, and, in an embodiment, from about 0.05 to about 0.20. Within this range, the optical film for improving contrast ratio can provide large effects of diffusing polarized light while improving contrast ratio. In particular, the contrast ratio improving layer, in which the difference in index of refraction is in a range from about 0.05 to about 0.15, can have an excellent effect of diffusing polarized light in an optical display and thus improve brightness even at the same viewing angle.

In an embodiment, the second resin layer 120A may have an index of refraction of about 1.50 or more, and, in an embodiment, about 1.50 to about 1.70. Within this range, the optical film for improving contrast ratio 10 can have an excellent effect on light diffusion. The second resin layer 120A may be formed of a UV-curable or thermally-curable composition including at least one of (meth)acrylic, polycarbonate, silicone, and epoxy resins, without being limited thereto.

Light Absorber

The light absorber 130 absorbs light which reaches the flat section 122 while being incident from the first resin layer 110A in a lateral direction and thus prevents or substantially prevents total reflection of the light by the inclined surface 123 of the optical pattern 121, thereby reducing minimum reflectance and improving front contrast ratio. Generally, although an optical film for improving contrast ratio includes a light absorber and thus can improve contrast ratio, when the optical film for improving contrast ratio includes the light absorber, there can be problems of significant deterioration in brightness and increase in white color due to backscattering by particles. Generally, an anti-reflective film for reducing minimum reflectance includes a base layer, a high index-of-refraction layer, and a low index-of-refraction layer formed in the stated order and reduces the minimum reflectance measured on the low index-of-refraction layer, whereas the optical film for improving contrast ratio according to the present invention can reduce the minimum reflectance of the high index-of-refraction layer despite including the low index-of-refraction layer and the high index-of-refraction layer stacked in the stated order.

As described above, the light absorber 130 may not be present in the region of the second resin layer 120A between the first surface 124, which corresponds to the top part of the optical pattern 121, and the upper surface 120Aa of the second resin layer 120A, and may be present in the region of the second resin layer 120A between adjacent optical patterns 121. In this way, the optical film for improving contrast ratio 10 can simultaneously improve front relative brightness, front contrast ratio, and side contrast ratio. In an exemplary embodiment, the light absorber 130 is present in the trapezoidal region formed by the flat section 122 and the inclined surfaces 123 of the adjacent optical patterns 121 in FIG. 1. Although not shown in FIG. 1, the light absorber 130 may be present in the region of the second resin layer 120A except the region thereof between the first surface 124, which corresponds to the top part of the optical pattern 121, and the upper surface 120Aa of the second resin layer 120A.

In an embodiment, the light absorber 130 may have an average diameter R (D50) of about 20 μm or less, and, in an embodiment, about 10 μm or less, or about 6 μm or less. Within this range, the light absorber 130 can be expected to absorb light while being present between the optical patterns, and can have no effect on side contrast ratio. The "average diameter (D50)" may be measured by a general method known to those skilled in the art.

The average diameter R (D50) of the light absorber 130 may be less than the maximum width L of the flat section 122 of the optical pattern 121.

In an embodiment, the light absorber 130 is present in an amount of about 0.01% by weight (wt %) to about 5.0 wt %, and, in an embodiment, about 0.01 wt % to about 4.0 wt %, or about 0.01 wt % to about 3.0 wt % in the second resin layer 120A. Within this range, the light absorber 130 can improve front contrast ratio by absorbing light, and can prevent or substantially prevent deterioration in brightness due to use of an excess thereof.

The light absorber 130 may include particles having a light absorbing layer on surfaces thereof, for example, a light diffuser having a light absorbing layer on a surface thereof. In an exemplary embodiment, the light absorbing layer is formed on the entire surface of each of the particles. The light absorbing layer has an effect of absorbing light as described above. In an embodiment, the light absorbing layer may have a thickness of about 1.0 μm or less, and, in an embodiment, about 0.01 μm to about 0.5 μm. Within this range, the light absorbing layer can have the effect of absorbing light. The light absorbing layer may include a general light absorbing material known to those skilled in the art, for example, carbon black, without being limited thereto. The light absorbing layer may include a light absorbing material alone, or may include a light absorbing material and a resin. The resin may be selected not to affect the effect of the second resin layer 120A while exhibiting good compatibility with the light absorbing material. The light diffuser, which determines the shape of the light absorber, may have a spherical, semi-spherical, or amorphous shape, and be a general light diffuser known to those skilled in the art. For example, the light diffuser may include at least one of organic and inorganic light diffusers. These light diffusers may be used alone or in combination thereof. The organic light diffuser may include at least one of (meth)acrylic, siloxane, and styrene particles. The inorganic light diffuser may include at least one of calcium carbonate, barium sulfate, titanium dioxide, aluminum hydroxide, silica, glass, talc, mica, white carbon, magnesium oxide, and zinc oxide.

First Resin Layer

The first resin layer 110A may refract and emit light upon receiving light through a lower surface thereof from an optical display in various directions depending upon light incident positions, thereby diffusing the light. In an embodiment, the first resin layer 110A is formed in direct contact with the second resin layer 120A.

The first resin layer 110A may include a filling pattern 111 at least partially filling the optical pattern 121. When an element is referred to as "at least partially filling" the optical pattern, the element may completely fill the optical pattern, or partially fill the optical pattern. When the filling pattern partially fills the optical pattern, the remaining space of the optical pattern may be filled with air or a resin having a certain index of refraction. In an embodiment, the resin may have an index of refraction which is less than or equal to that of the first resin layer and is greater than or equal to that of the second resin layer.

The first resin layer 110A may be a layer including the filling pattern 111. In an embodiment, the first resin layer 110A may have an index of refraction of less than about 1.52, and, in an embodiment, about 1.35 or more and less than about 1.50.

Within this range, the optical film for improving contrast ratio can have a large effect of light diffusion, can be easily formed, and can have large effects of diffusing polarized light and improving contrast ratio. In an embodiment, the first resin layer 110A may be formed of a UV-curable or thermally-curable composition including a transparent resin. The transparent resin may include at least one of (meth) acrylic, polycarbonate, silicone, and epoxy resins, without being limited thereto. In an embodiment, the transparent resin may have a light transmittance of about 90% or more after curing.

In an embodiment, the first resin layer 110A may have a minimum thickness H3 of about 1 µm or more, and, in an embodiment, about 5 µm to about 20 µm. Within this range, the first resin layer 110A can be used for the optical film for improving contrast ratio. In particular, when the first resin layer 110A is self-adhesive and is directly attached to a polarizing film, the first resin layer 110A allows the optical film for improving contrast ratio to be attached well to the polarizing film.

FIG. 1 shows a structure in which the second resin layer 120A has a higher index of refraction than the first resin layer 110A. However, the second resin layer 120A may have a lower index of refraction than the first resin layer 110A. In an embodiment, the second resin layer 120A may have an index of refraction of less than about 1.52, and, in an embodiment, about 1.35 or more and less than about 1.50, and the first resin layer 110A may have an index of refraction of about 1.50 or more, and, in an embodiment, about 1.50 to about 1.70, or about 1.50 to about 1.60. Within this range, the optical film for improving contrast ratio can have an excellent effect of light diffusion. Within this range, the optical film for improving contrast ratio can improve side contrast ratio.

In an embodiment, the contrast ratio improving layer 100A may have a thickness of about 10 µm to about 100 µm, and, in an embodiment, about 10 µm to about 60 µm, and, in an embodiment, about 10 µm to about 45 µm. Within this range, the contrast ratio improving layer 100A can be used for an optical display.

The contrast ratio improving layer 100A may be stacked on the protective layer 200.

In one embodiment, the second resin layer 120A may be a non-adhesive layer having no adhesion. In this case, one or more adhesive layers, bonding layers, or adhesive bonding layers may be formed between the second resin layer 120A and the protective layer 200. In another embodiment, the second resin layer 120A may be self-adhesive. In this case, the second resin layer 120A may be directly formed on the protective layer 200. In an embodiment, when the second resin layer 120A is self-adhesive, the second resin layer 120A may be formed of at least one of acrylic, epoxy and urethane resins, and allows thickness reduction of the optical film for improving contrast ratio 10.

Protective Layer

The protective layer 200 may be formed on the contrast ratio improving layer 100A, support the contrast ratio improving layer 100A, and emit light emitted from the contrast ratio improving layer 100A.

The protective layer 200 may include at least one of a protective film and a protective coating layer, which are optically transparent.

When the protective layer 200 is of a protective film type, the protective layer may include a protective film formed of an optically transparent resin. The protective film may be formed through melting and extrusion of the resin. The resin may be further subjected to stretching, as needed. In an embodiment, the optically transparent resin may include at least one selected from cellulose esters including triacetyl cellulose, cyclic polyolefin including amorphous cyclic olefin polymer (COP), polycarbonate, polyester including polyethylene terephthalate (PET), polyethersulfone, polysulfone, polyamide, polyimide, non-cyclic polyolefin, polyacrylate including poly(methyl methacrylate), polyvinyl alcohol, polyvinyl chloride, and polyvinylidene chloride resins.

The protective film may be a non-stretched film, a retardation film which is obtained by stretching the resin by a certain method and has a certain range of retardation, or an isotropic optical film. In one embodiment, the protective film may have an Re of about 8,000 nm or more, and, in an embodiment, about 10,000 nm or more, and, in an embodiment, greater than about 10,000 nm, and, in an embodiment, about 10,100 nm to about 15,000 nm. Within this range, the protective film can prevent or substantially prevent generation of rainbow spots while further diffusing light diffused by the contrast ratio improving layer. In another embodiment, the protective film may be an optically isotropic film having an Re of about 60 nm or less, and, in an embodiment, about 0 nm to about 60 nm, and, in an embodiment, about 40 nm to about 60 nm. Within this range, the protective film can provide good image quality through compensation for viewing angle. Herein, the term "isotropic optical film" means a film having substantially the same nx, ny, and nz, and the expression "substantially the same" includes not only the case where nx, ny, and nz are completely the same, but also the case where there is an acceptable margin of error between nx, ny, and nz.

Although not shown in FIG. 1, the protective film may include a base film and a primer layer formed on at least one surface of the base film. In an embodiment, a ratio of an index of refraction of the primer layer to an index of refraction of the base film (index of refraction of primer layer/index of refraction of base film) may be about 1.0 or less, and, in an embodiment, may be in a range from about 0.6 to about 1.0, and, in an embodiment, from about 0.69 to about 0.95, and, in an embodiment, from about 0.7 to about 0.9, and, in an embodiment, from about 0.72 to about 0.88. Within this range, a first base layer can have improved transmittance. In an embodiment, the base film may have an index of refraction of about 1.3 to about 1.7, and, in an embodiment, about 1.4 to about 1.6. Within this range, the base film can be used as the first base layer, allow easy control of the index of refraction with respect to the primer layer, and improve transmittance of the first base layer. The base film may include a film formed of the resin as set forth above. In an embodiment, the primer layer may have an index of refraction of about 1.0 to about 1.6, and, in an embodiment, about 1.1 to about 1.6, and, in an embodiment, about 1.1 to about 1.5. Within this range, the primer layer has an appropriate index of refraction, as compared with the base film, thereby improving the transmittance of the base layer. In an embodiment, the primer layer may have a thickness of about 1 nm to about 200 nm, and, in an embodiment, about 60 nm to about 200 nm. Within this range, the primer layer can be used for an optical film, have an appropriate index of refraction, as compared with the base film, and thus improve transmittance of the base layer without embrittlement. In an embodiment, the primer layer may be a non-urethane primer layer free from a urethane group. In an embodiment, the primer layer may be formed of a primer layer composition including a resin or monomer such as polyester, acryl, or the like. The primer layer may have the index of refraction as set forth above by controlling a mixing ratio (for example, a molar ratio) between these monomers. The primer layer composition may further include at least one of additives, such as UV absorbers, antistatic agents, defoamers, surfactants, and the like.

When the protective layer is of a protective coating layer type, the protective layer can provide excellent properties in terms of adhesion to the second resin layer, transparency, mechanical strength, thermal stability, moisture blocking, and durability. In one embodiment, the protective coating layer may be formed of an actinic radiation-curable resin composition including an actinic radiation-curable compound and a polymerization initiator.

In an embodiment, the actinic radiation-curable compound may include at least one of a cationic polymerizable curable compound, a radical polymerizable curable compound, a urethane resin, and a silicone resin. The cationic polymerizable curable compound may be an epoxy compound having at least one epoxy group, or an oxetane compound having at least one oxetane ring per molecule. The radical polymerizable curable compound may be a (meth)acrylic compound having at least one (meth)acryloyloxy group per molecule.

The epoxy compound may include at least one of a hydrogenated epoxy compound, a chain-type aliphatic epoxy compound, a cyclic aliphatic epoxy compound, and an aromatic epoxy compound.

The radical polymerizable curable compound may realize a protective coating layer having excellent hardness and mechanical strength and high durability. Examples of the radical polymerizable curable compound may include a (meth)acrylate monomer having at least one (meth)acryloyloxy group per molecule and a (meth)acrylate oligomer obtained by reacting at least two functional group-containing compounds and having at least two (meth)acryloyloxy groups per molecule. Examples of the (meth)acrylate monomer may include a monofunctional (meth)acrylate monomer having one (meth)acryloyloxy group per molecule, a bifunctional (meth)acrylate monomer having two (meth)acryloyloxy groups per molecule, and a polyfunctional (meth)acrylate monomer having three or more (meth)acryloyloxy groups per molecule. Examples of the (meth)acrylate oligomer may include a urethane (meth)acrylate oligomer, a polyester (meth)acrylate oligomer, and an epoxy (meth)acrylate oligomer.

The polymerization initiator can cure the actinic radiation-curable compound. The polymerization initiator may include at least one of a photocationic initiator and a photosensitizer. The photocationic initiator may include any typical photocationic initiator known in the art. In an embodiment, the photocationic initiator may include an onium salt including a cation and an anion. In an embodiment, the cation may include diaryl iodonium such as diphenyliodonium, 4-methoxydiphenyliodonium, bis(4-methylphenyl)iodonium, bis(4-tert-butylphenyl)iodonium, bis(dodecylphenyl)iodonium, and (4-methylphenyl)[(4-(2-methylpropyl)phenyl)iodonium; triarylsulfoniums such as triphenylsulfonium and diphenyl-4-thiophenoxyphenylsulfonium; and bis[4-(diphenylsulfonio)phenyl]sulfide. In an embodiment, the anion may include hexafluorophosphate ($PF_6^-$), tetrafluoroborate ($BF_4^-$), hexafluoroantimonate ($SbF_6^-$), hexafluoroarsenate ($AsF_6^-$), and hexachloroantimonate ($SbCl_6^-$). The photosensitizer may be any typical photosensitizer known in the art. In an embodiment, the photosensitizer may include at least one selected from thioxanthone, phosphorus, triazine, acetophenone, benzophenone, benzoin, and oxime photosensitizers.

The actinic radiation-curable resin composition may further include general additives, such as silicone leveling agents, UV absorbers, antistatic agents, and the like.

In an embodiment, the protective layer 200 may have a thickness of about 5 μm to about 200 μm, and, in an embodiment, about 30 μm to about 120 μm. In an embodiment, the protective layer 200 of a protective film type may have a thickness of about 30 μm to about 100 μm, and the protective layer 200 of a protective coating layer type may have a thickness of about 5 μm to about 50 μm. Within this range, the protective layer 200 can be used in a light emitting display.

A surface treatment layer, such as primer, hard coating, anti-fingerprint, anti-reflective, anti-glare, low-reflective, and ultralow-reflective layer, may be further formed on at least one surface of the protective layer 200. The primer layer may improve adhesion between a polarizer and the protective layer. The hard coating, anti-fingerprint, anti-reflective layer, or the like may provide additional functions to the protective layer 200, the polarizing film, or the like.

In an embodiment, the optical film for improving contrast ratio 10 may have a thickness of about 30 μm to about 200 μm, and, in an embodiment, about 40 μm to about 150 μm.

Within this range, the optical film for improving contrast ratio 10 can secure processability and exhibit improved surface hardness.

The optical film for improving contrast ratio 10 may be manufactured by a general method known to those skilled in the art. For example, a resin for the second resin layer 120A, which includes the light absorber 130, may be coated onto the protective layer 200, subjected to application of the optical pattern 121 and the flat section 122, and then cured, thereby forming the second resin layer 120A. Next, a resin for the first resin layer 110A may be coated onto the second resin layer 120A while filling the optical pattern 121, and then cured, thereby forming the optical film for improving contrast ratio 10. However, the present invention is not limited thereto.

Figure 2:
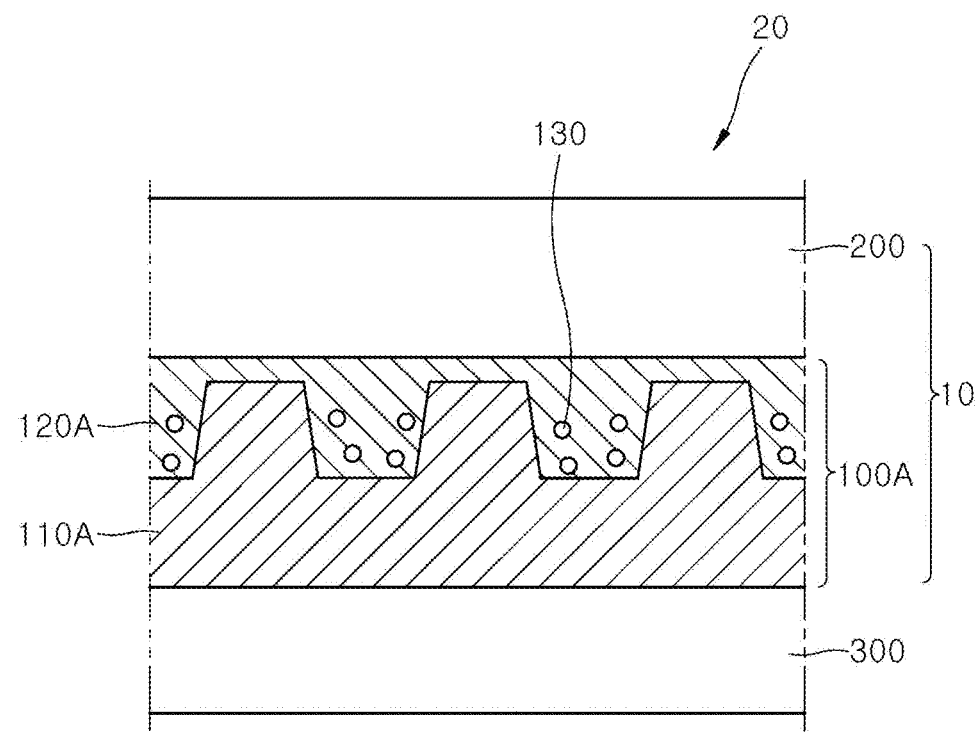
FIG. 2 is a cross-sectional view of a polarizing plate according to an embodiment of the present invention.

According to the present invention, a polarizing plate may include the optical film for improving contrast ratio according to the present invention. A polarizing plate according to an embodiment of the present invention will be described with reference to FIG. 2. FIG. 2 is a cross-sectional view of a polarizing plate according to an embodiment of the present invention.

Referring to FIG. 2, a polarizing plate 20 may include a polarizing film 300 and the optical film for improving contrast ratio 10.

Polarizing Film

The polarizing film 300 may polarize and transmit light incident from a liquid crystal panel. The polarizing film 300 is formed on a light incident surface of the contrast ratio improving layer 100A.

The polarizing film 300 may include a polarizer. In an embodiment, the polarizer may include a polyvinyl alcohol polarizer obtained by uniaxially stretching a polyvinyl alcohol film, or a polyene-based polarizer obtained by dehydrating a polyvinyl alcohol film. In an embodiment, the polarizer may have a thickness of about 5 μm to about 40 μm. Within this range, the polarizing film 300 can be used in an optical display.

The polarizing film 300 may include the polarizer and a protective layer formed on at least one surface of the polarizer. The protective layer protects the polarizer, thereby improving reliability and mechanical strength of the polarizing plate 20. Descriptions of the protective layer are substantially the same as the descriptions provided above as to the protective layer included in the optical film for improving contrast ratio. In an embodiment, the protective layer is a polyester protective film (for example, a polyethylene terephthalate film) having an Re of about 8,000 nm or more, and, in an embodiment, about 10,000 nm or more, and, in an embodiment, greater than about 10,000 nm, and, in an embodiment, about 10,100 nm to about 15,000 nm.

The contrast ratio improving layer 100A may be formed on the polarizing film 300.

In one embodiment, the first resin layer may be a non-adhesive layer having no adhesion. In this case, one or more adhesive layers, bonding layers, or adhesive bonding layers may be formed between the first resin layer 110A and the polarizing film 300. In another embodiment, the first resin layer may be self-adhesive. In this case, the first resin layer 110A may be directly formed on the polarizing film 300. In an embodiment, when the first resin layer is self-adhesive, the first resin layer may be formed of at least one of acrylic, epoxy, and urethane resins.

Although not shown in FIG. 2, an adhesive layer may be formed on a lower surface of the polarizing film 300 and thus bond the polarizing plate 200 to the liquid crystal panel.

Although not shown in FIG. 2, one or more protective layers, anti-reflective films, and the like may be further stacked on a light exit surface of the protective layer 200 via an adhesive layer.

According to one or more embodiments of the present invention, a liquid crystal display may include the polarizing plate 200 according to the present invention.

In an embodiment, the liquid crystal display may include the polarizing plate 200 at the viewer side with respect to a liquid crystal panel. Herein, the term "polarizing plate at the viewer side" refers to a polarizing plate placed on the side of a screen of the liquid crystal panel, that is, on a side of the liquid crystal panel opposite a light source.

In an embodiment, the liquid crystal display may include a backlight unit, a first polarizing plate, the liquid crystal panel, and a second polarizing plate, which are stacked in the stated order, wherein the second polarizing plate may include the polarizing plate according to the present invention. The liquid crystal panel may employ a vertical alignment (VA) mode, an IPS mode, a patterned vertical alignment (PVA) mode, or a super-patterned vertical alignment (S-PVA) mode, without being limited thereto.

In another embodiment, the liquid crystal display may include the polarizing plate 200 at a light source side. Herein, the term "polarizing plate at the light source side" refers to a polarizing plate disposed at the light source side with respect to the liquid crystal panel.

In a further embodiment, both the polarizing plate at the viewer side and the polarizing plate at the light source side with respect to the liquid crystal panel may include the polarizing plate according to the present invention.

Next, the present invention will be described in more detail with reference to some examples. However, it should be noted that these examples are provided for illustration only and are not to be construed in any way as limiting the present invention.

Example 1

A UV curable resin (SSC-5760, SHIN-A T&C Co., Ltd.) including a light absorber was coated onto one surface of a polyethylene terephthalate (PET) film (thickness: 80 μm, Re=14,000 nm at wavelength of 550 nm, Toyobo Co., Ltd.) for protective layers. Then, a film having a patterned portion, which includes optical patterns having the same base angles at both sides thereof and a flat section formed between the optical patterns, was applied to the coating layer to form engraved patterns and a flat section, followed by curing, thereby forming a second resin layer (index of refraction: 1.60) including a patterned portion in which engraved patterns (having a trapezoidal shape as shown in FIG. 1) having the same base angles at both sides thereof as listed in Table 1, and a flat section were formed.

Figure 3:
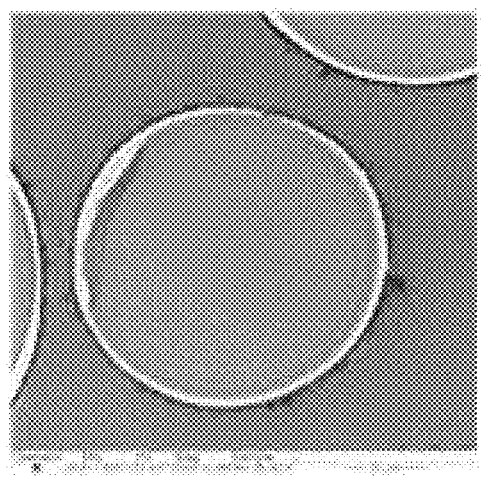
FIG. 3 is a TEM image of a light absorber used in an example.

Here, the light absorber was a light absorber (xx-2740, Sekisui Co., Ltd.) in which a carbon black-containing light absorbing layer was coated onto a surface of an acrylic light diffuser. The light absorber had an average diameter R (D50) of 6 μm. The light absorber was present in the trapezoidal region formed by the flat section and the inclined surfaces of the adjacent optical patterns as shown in FIG. 1. The light absorber was present in an amount of 0.5 wt % in the second resin layer. FIG. 3 is a TEM image of a cross-section of the light absorber used in Example 1.

A UV-curable resin (SSC-4560, SHIN-A T&C Co., Ltd.) was coated onto the second resin layer while completely filling the engraved pattern, followed by curing the UV-curable resin, thereby forming an optical film for improving contrast ratio in which a first resin layer (index of refraction: 1.48) having a filling pattern completely filling the engraved pattern was formed. The first resin layer was self-adhesive.

Examples 2 to 4

An optical film for improving contrast ratio was formed in the same manner as in Example 1 except that the amount of the light absorber was modified as listed in Table 2.

Comparative Example 1

An optical film for improving contrast ratio was formed in the same manner as in Example 1 except that the second resin layer did not include the light absorber.

Comparative Example 2

An optical film for improving contrast ratio was formed in the same manner as in Example 1 except that a thickness H2 of the second resin layer in Table 1 was modified to 15 μm, and that the light absorber was added in an amount as listed in Table 2. In the optical film for improving contrast ratio, the light absorber was also present in a region between a first surface of the optical pattern and the PET film.

Comparative Example 3

An optical film for improving contrast ratio was formed in the same manner as in Example 1 except that a light diffuser (Tospearl 145, Momentive Co., Ltd., silicone light diffuser, particle diameter: 4 μm), instead of the light absorber, was added in an amount as listed in Table 2.

TABLE 1

| Shape of optical pattern | Maximum height H1 of optical pattern (μm) | Maximum width W of optical pattern (μm) | Width A of first surface of optical pattern (μm) | Base angle θ of optical pattern (°) | Width L of flat section (μm) | Maximum thickness H2 of second resin layer (μm) |
|---|---|---|---|---|---|---|
| Cut-prism | 7 | 8 | 7 | 83 | 6 | 12 |

The optical films for improving contrast ratio of the Examples and Comparative Examples and polarizing plates manufactured using the optical films for improving contrast ratio were evaluated as to properties as listed in Table 2. Results are shown in Table 2.

Preparation of Polarizing Plate

A polarizer was prepared by stretching a polyvinyl alcohol film at 60° C. to 3 times an initial length thereof and adsorbing iodine to the stretched film, followed by stretching the film to 2.5 times the stretched length of the film in an aqueous solution of boric acid at 40° C.

The first resin layer of each of the optical films for improving contrast ratio of the Examples and Comparative Examples was bonded to one surface of the polarizer, thereby manufacturing a polarizing plate.

Reference Example 1

A polarizing plate was prepared in the same manner as in Example 1 except that a contrast ratio improving layer was not formed. A protective layer was stacked on one surface of the polarizer, thereby manufacturing a polarizing plate.

Front Brightness, Front Contrast Ratio, Side Contrast Ratio, and Viewing Angle

A module for liquid crystal displays was manufactured and evaluated as follows.

Preparative Example 1: Fabrication of First Polarizing Plate

A first polarizer was prepared by stretching a polyvinyl alcohol film to 3 times an initial length thereof at 60° C., and adsorbing iodine to the stretched film, followed by stretching the film to 2.5 times the stretched length of the film in an aqueous solution of boric acid at 40° C. As a base layer, a triacetyl cellulose film (thickness: 80 μm) was bonded to both surfaces of the first polarizer using a bonding agent (Z-200, Nippon Goshei Co., Ltd.) for polarizing plates, thereby fabricating a first polarizing plate.

Preparative Example 2: Fabrication of Module for Liquid Crystal Displays

The first polarizing plate of Preparative Example 1, a liquid crystal panel (PVA mode), and each of the polarizing plates prepared in the Examples and Comparative Examples were assembled in the stated order, thereby fabricating a module for liquid crystal displays. Each of the polarizing plates manufactured in the Examples and Comparative Examples was used as a visible-side polarizing plate.

An LED light source, a light guide plate, and the module for liquid crystal displays were assembled, thereby fabricating a liquid crystal display (which had the same configuration as a Samsung LED TV (UN32H5500) except for using each of the modules for liquid crystal displays of the Examples and Comparative Examples) including a one-side edge type LED light source.

Brightness was measured in each of a white mode and a black mode at each of coordinates (0°, 0°) and coordinates (0°, 60°) in a spherical coordinate system by using an EZCONTRAST X88RC (EZXL-176R-F422A4, ELDIM Co., Ltd.). Front contrast ratio was calculated as a ratio of brightness in the white mode to brightness in the black mode at the coordinates (0°, 0°) in the spherical coordinate system. Side contrast ratio was calculated as a ratio of brightness in the white mode to brightness in the black mode at the coordinates (0°, 60°) in the spherical coordinate system.

Viewing angles at which values of brightness corresponding to ½ and ⅓ of front brightness were measured in the white mode were taken as ½ viewing angle and ⅓ viewing angle, respectively.

Minimum Reflectance

Reflectance was measured on a specimen, which was prepared by laminating a black acryl sheet (CLAREX, Nitto Jushi Kogyo Co., Ltd.) to the first resin layer of each of the optical films for improving contrast ratio of the Examples and Comparative Examples, at a wavelength of 320 nm to 800 nm in a reflection mode by using a reflectance measuring device, and a minimum value of the measured reflectance values was taken as minimum reflectance.

TABLE 2

| | Example 1 | Example 2 | Example 3 | Example 4 | Comparative Example 1 | Comparative Example 2 | Comparative Example 3 | Reference Example 1 |
|---|---|---|---|---|---|---|---|---|
| H2-H1 (wall thickness) (μm) | 5 | 5 | 5 | 5 | 5 | 8 | 5 | — |
| R (average diameter of light absorber) (μm) | 6 | 6 | 6 | 6 | — | 6 | — | — |
| Average diameter of light diffuser (μm) | — | — | — | — | — | — | 4 | — |
| H1 (height of optical pattern) (μm) | 7 | 7 | 7 | 7 | 7 | 7 | 7 | — |
| Amount of light absorber or light diffuser in second resin layer (wt %) | 0.5 | 1.0 | 2.0 | 3.0 | 0 | 2.0 | 0.5 | — |
| Front brightness (nit) | 449 | 441 | 427 | 421 | 442 | 401 | 448 | 462 |
| Contrast ratio (0°, 0°) | 5526 | 5114 | 4574 | 4426 | 4325 | 4125 | 4210 | 6332 |
| Contrast ratio (0°, 60°) | 615 | 619 | 630 | 642 | 614 | 610 | 615 | 451 |
| Viewing angle ½ (°) | 76 | 77 | 77 | 76 | 73 | 75 | 76 | 69 |
| Viewing angle ⅓ (°) | 101 | 102 | 102 | 101 | 99 | 100 | 101 | 95 |
| Minimum reflectance (%) | 3.87 | 3.85 | 3.70 | 3.60 | 3.93 | 3.40 | 4.07 | 3.30 |

As shown in Table 2, the optical films for improving contrast ratio of the Examples and the polarizing plates including the optical films for improving contrast ratio could simultaneously improve front brightness, front contrast ratio, and side contrast ratio, and could increase side viewing angle. In addition, the optical films for improving contrast ratio and the polarizing plates according to the present invention could reduce minimum reflectance, thereby improving image quality and black visibility even in a non-driven state of the module.

On the other hand, the specimen of Comparative Example 1 not including the light absorber exhibited low front contrast ratio and could not exhibit improved black visibility due to high minimum reflectance thereof.

The specimen of Comparative Example 2, in which the light absorber was also present in the region between the first surface of the optical pattern and the PET film, exhibited reduced front contrast ratio and front brightness.

Despite increased viewing angle, the specimen of Comparative Example 3 including the light diffuser did not include the light absorber and thus had problems of low front contrast ratio and increased reflectance.

Figure 4:
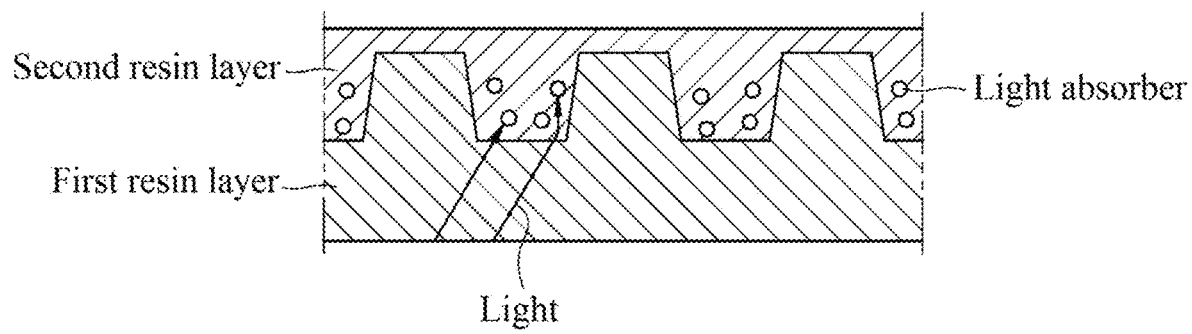
FIG. 4 is a schematic diagram illustrating improvement in front contrast ratio according to an example.

Referring to FIG. 4, when the light absorber is present in a region of a highly refractive resin layer between the optical patterns, light incident in the lateral direction with respect to the flat section is absorbed by the light absorber and thus prevented or substantially prevented from being totally reflected by the inclined surface of the optical patterns, thereby improving front contrast ratio and reducing minimum reflectance.

Figure 5:
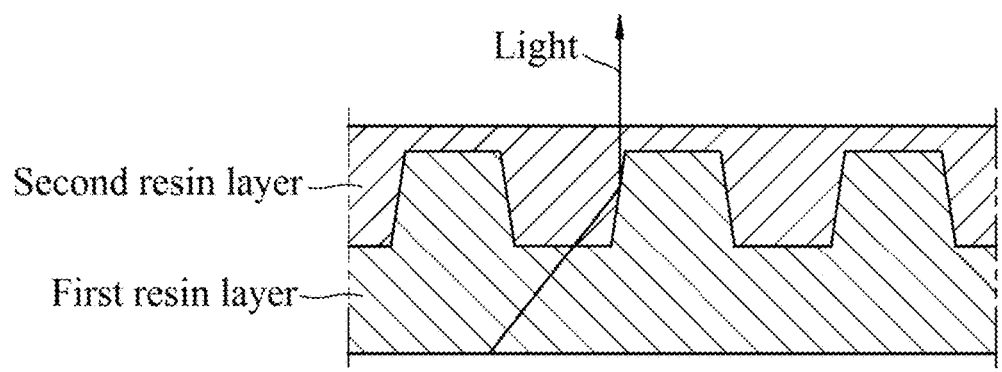
FIG. 5 illustrates an optical path according to a comparative example.

Referring to FIG. 5, when the highly refractive resin layer does not include the light absorber, relative brightness in the front direction is reduced as brightness in the black mode is increased due to total reflection by the inclined surface of the optical pattern in the black mode.

While the present invention has been described with respect to some exemplary embodiments, it is to be understood that various modifications, changes, alterations, and equivalent embodiments can be made by those skilled in the art without departing from the spirit and scope of the present invention.

What is claimed is:

1. An optical film for improving contrast ratio including a protective layer and a contrast ratio improving layer on the protective layer,
    wherein the contrast ratio improving layer includes a first resin layer and a second resin layer facing the first resin layer, and
    the second resin layer includes a patterned portion having optical patterns and a flat section between the optical patterns, contains a light absorber, and satisfies the following Equation 1:

$(H2-H1) < R \leq H1$ where H2 is a maximum thickness (unit: μm) of the second resin layer, H1 is a maximum height (unit: μm) of the optical patterns, and R is an average diameter (D50) (unit: μm) of the light absorber.

2. The optical film for improving contrast ratio according to claim 1, wherein the optical film for improving contrast ratio has a minimum reflectance of about 3.90% or less, as measured from a protective layer side.

3. The optical film for improving contrast ratio according to claim 1, wherein the light absorber is present between an optical pattern of the optical patterns and an adjacent optical pattern of the optical patterns.

4. The optical film for improving contrast ratio according to claim 1, wherein the light absorber is present in an amount of about 0.01 wt % to about 5 wt % in the second resin layer.

5. The optical film for improving contrast ratio according to claim 1, wherein the light absorber includes particles having a light absorbing layer on surfaces thereof.

6. The optical film for improving contrast ratio according to claim 5, wherein the particles include at least one of (meth)acrylic, siloxane, and styrene particles.

7. The optical film for improving contrast ratio according to claim 1, wherein the light absorber has an average diameter R (D50) of about 20 μm or less.

8. The optical film for improving contrast ratio according to claim 1, wherein each of the optical patterns has a base angle of about 75° to about 90°, and the patterned portion satisfies the following Equation 2:

$1 < P/W \leq 10$, where P is a period (unit: μm) of the patterned portion, and W is a maximum width (unit: μm) of the optical pattern.

9. The optical film for improving contrast ratio according to claim 1, wherein each of the optical patterns includes a first surface at a top part thereof and one or more inclined surfaces connected to the first surface, and each of the inclined surfaces comprises a flat surface or a curved surface.

10. The optical film according to claim 1, wherein each of the optical patterns has an aspect ratio of about 0.3 to about 10.0.

11. The optical film for improving contrast ratio according to claim 1, wherein the second resin layer has a higher index of refraction than the first resin layer.

12. The optical film for improving contrast ratio according to claim 1, wherein an absolute value of a difference in index of refraction between the second resin layer and the first resin layer is from about 0.05 to about 0.30.

13. The optical film for improving contrast ratio according to claim 1, wherein the first resin layer directly contacts the second resin layer, and the second resin layer directly contacts the protective layer.

14. The optical film for improving contrast ratio according to claim 1, wherein the protective layer includes a protective film having an Re of about 8,000 nm or more at a wavelength of 550 nm.

15. The optical film for improving contrast ratio according to claim 14,
wherein the protective film is formed of a polyester resin.

16. A polarizing plate including:
a polarizing film; and
the optical film for improving contrast ratio according to claim 1, the optical film for improving contrast ratio being arranged on a surface of the polarizing film.

17. The polarizing plate according to claim 16, wherein the surface of the polarizing film on which the optical film for improving contrast ratio is arranged comprises a light exit surface of the polarizing film.

18. The polarizing plate according to claim 16, wherein the first resin layer is self-adhesive and is directly on the polarizing film.

19. A liquid crystal display including the polarizing plate according to claim 16.

* * * * *